US012151167B2

(12) United States Patent
Dorn et al.

(10) Patent No.: US 12,151,167 B2
(45) Date of Patent: Nov. 26, 2024

(54) ADAPTIVE DIFFICULTY CALIBRATION FOR SKILLS-BASED ACTIVITIES IN VIRTUAL ENVIRONMENTS

(71) Applicants: SONY INTERACTIVE ENTERTAINMENT LLC, San Mateo, CA (US); SONY INTERACTIVE ENTERTAINMENT INC., Tokyo (JP)

(72) Inventors: Victoria Dorn, San Mateo, CA (US); Celeste Bean, San Mateo, CA (US); Elizabeth Juenger, San Mateo, CA (US); Kristie Ramirez, San Mateo, CA (US); Sepideh Karimi, San Mateo, CA (US); Mahdi Azmandian, San Mateo, CA (US)

(73) Assignees: SONY INTERACTIVE ENTERTAINMENT LLC, San Mateo, CA (US); SONY INTERACTIVE ENTERTAINMENT INC., Tokyo (JP)

( * ) Notice: Subject to any disclaimer, the term of this patent is extended or adjusted under 35 U.S.C. 154(b) by 305 days.

(21) Appl. No.: 17/828,707

(22) Filed: May 31, 2022

(65) Prior Publication Data

US 2023/0381662 A1    Nov. 30, 2023

(51) Int. Cl.
*A63F 13/67*    (2014.01)
*A63F 13/45*    (2014.01)
*A63F 13/798*   (2014.01)

(52) U.S. Cl.
CPC ............ *A63F 13/67* (2014.09); *A63F 13/45* (2014.09); *A63F 13/798* (2014.09)

(58) Field of Classification Search
CPC ......... A63F 13/67; A63F 13/45; A63F 13/798
(Continued)

(56) References Cited

U.S. PATENT DOCUMENTS 11,806,630 B1    11/2023    Dorn et al.
2005/0113158 A1   5/2005    Sterchi et al.
(Continued)

FOREIGN PATENT DOCUMENTS

| WO | 20180154327 A1 | 8/2018 |
| WO | WO 2023/235089 | 12/2023 |
| WO | WO 2023/235090 | 12/2023 |

OTHER PUBLICATIONS

PCT Application No. PCT/US2023/020722, International Search Report mailed Jul. 21, 2023 (16 pages).
(Continued)

*Primary Examiner* — Michael A Cuff
(74) *Attorney, Agent, or Firm* — Polsinelli LLP

(57) ABSTRACT

Methods of the present disclosure may collect data when a user plays one or more different types of games when determinations are made as to whether the difficulty of a game should be changed. The collected data maybe evaluated to identify whether a user gaming performance level corresponds to an expected level of performance. When the user gaming performance level does not correspond to an expected level of performance, parameters that change the difficultly of the game may be changed automatically. Parameters that relate to movement speed, delay or hesitation, character strengths, numbers of competitors, or other metrics may be changed incrementally until a current user performance level corresponds to an expectation level of a particular user currently playing the game. At this time, the user expectation level may be changed, and the process may be repeated as skills of the user are developed over time.

21 Claims, 5 Drawing Sheets

(58) Field of Classification Search
USPC .......................................................... 463/31
See application file for complete search history.

(56) References Cited

U.S. PATENT DOCUMENTS

| | | | |
|---|---|---|---|
| 2006/0287023 | A1 | 12/2006 | Yokoyama |
| 2007/0066403 | A1* | 3/2007 | Conkwright .......... A63F 13/803 |
| | | | 463/43 |
| 2011/0306395 | A1 | 12/2011 | Ivory et al. |
| 2012/0262407 | A1 | 10/2012 | Hinckley et al. |
| 2017/0278202 | A1* | 9/2017 | Mimassi ................ G06Q 50/12 |
| 2017/0345260 | A1* | 11/2017 | Strause ............... G07F 17/3293 |
| 2018/0243656 | A1 | 8/2018 | Aghdaie et al. |
| 2019/0099676 | A1 | 4/2019 | Bostick et al. |
| 2021/0031115 | A1* | 2/2021 | McCoy ................... A63F 13/67 |
| 2021/0086083 | A1 | 3/2021 | Aghdaie et al. |
| 2021/0187398 | A1 | 6/2021 | Nair et al. |
| 2021/0400142 | A1 | 12/2021 | Jorasch et al. |
| 2022/0032199 | A1* | 2/2022 | Rudi ....................... A63F 13/67 |
| 2022/0308667 | A1 | 9/2022 | Croxford et al. |

OTHER PUBLICATIONS

PCT Application No. PCT/US2023/020723, International Search Report mailed Jul. 21, 2023 (14 pages).

* cited by examiner

ADAPTIVE DIFFICULTY CALIBRATION FOR SKILLS-BASED ACTIVITIES IN VIRTUAL ENVIRONMENTS

BACKGROUND OF THE INVENTION

1. Field of the Disclosure

The present disclosure is generally related to adjusting difficulty levels of games based on skills associated with a user. More specifically, the present disclosure is directed to increasing user satisfaction by calibrating an interactive session for a specific user across their specific skills.

2. Description of the Related Art

In recent years, the field of computer gaming has grown to include many different types of games and many different types of gaming apparatus. Commonly, computer games have different fixed levels of difficulty. These difficulty levels may include an easy level, a medium level, and a difficult level where each respective level provides greater challenges to the user that are often associated with a theme of the game. For example, for first-person shooter games, a character of a user is usually pitted against characters that move through a battle space as the user attempts to shoot each respective adversarial character to meet an objective of the game. Here lower levels of difficulty may include fewer adversarial characters that move at slower speeds, where a higher level includes more adversarial characters that move at faster speeds. Higher levels of a game may also include adversarial characters that are more resistant to receiving injury while operating at a greater proficiency as compared to adversarial characters associated with a lower level of a game.

When a gaming level transitions from one level to another level (e.g. from a medium level to a high level), challenges provided to a user may make a user that performs very well at the medium difficulty level perform very poorly at the high difficulty level. Since games today have fixed levels of difficulty, a user that enjoyed playing the game at one level may not enjoy the game very much at a higher level of difficulty. In certain instances, one level of difficulty may be considered by the user to be too easy for the user, and the next level may be considered by the user to be too difficult. Moreover, the user may be highly skilled and experience in one type of challenge, while lacking skill and experience in another, both of which may be present in the same game or session. As such, high difficulty may result in inability to compete as to the lacking skill, while low difficulty does not present much challenge. In such instances, a user may simply stop playing the game out of a combination of boredom and frustration.

What are needed are new methods that allow the difficulty of an interactive session to be dynamically adjusted according to the current capabilities of a user and that change as the capabilities of the user change overtime.

SUMMARY OF THE PRESENTLY CLAIMED INVENTION

The presently claimed invention relates to a method, a non-transitory computer readable storage medium, or an apparatus executing functions consistent with the present disclosure for helping users improve their performance when playing a game. In a first embodiment, a method consistent with the present disclosure may include the steps of identifying a user performance level based on an analysis of collected game performance data, comparing the user performance level to a user expectation level, identifying based on the comparison that the user performance level does not correspond to the user expectation level, and selecting a game difficulty parameter to update based on the game difficulty parameter being associated with changing the user performance level. This game difficulty parameter may then be updated after which the user continues playing the game. This method may also include identifying that an updated user performance level corresponds to the user expectation level based on an analysis of additional game performance data, where the additional game performance data is collected after the update to the game difficulty parameter.

In a second embodiment, the presently claimed method may be implemented as a non-transitory computer-readable storage medium where a processor executes instructions out of a memory. Here again the method may include the steps of identifying a user performance level based on an analysis of collected game performance data, comparing the user performance level to a user expectation level, identifying based on the comparison that the user performance level does not correspond to the user expectation level, and selecting a game difficulty parameter to update based on the game difficulty parameter being associated with changing the user performance level. This game difficulty parameter may then be updated after which the user continues playing the game. This method may also include identifying that an updated user performance level corresponds to the user expectation level based on an analysis of additional game performance data, where the additional game performance data is collected after the update to the game difficulty parameter.

DETAILED DESCRIPTION

Methods of the present disclosure may collect data when a user plays one or more different types of games when determinations are made as to whether the difficulty of a game should be changed. The collected data maybe evaluated to identify whether a user gaming performance level corresponds to an expected level of performance. When the user gaming performance level does not correspond to an expected level of performance, parameters that change the difficultly of the game may be changed automatically. Parameters that relate to movement speed, delay or hesitation, character strengths, numbers of competitors, or other metrics may be changed incrementally until a current user performance level corresponds to an expectation level of a particular user currently playing the game. At this time, the user expectation level may be changed, and the process may be repeated as skills of the user are developed over time.

Figure 1:
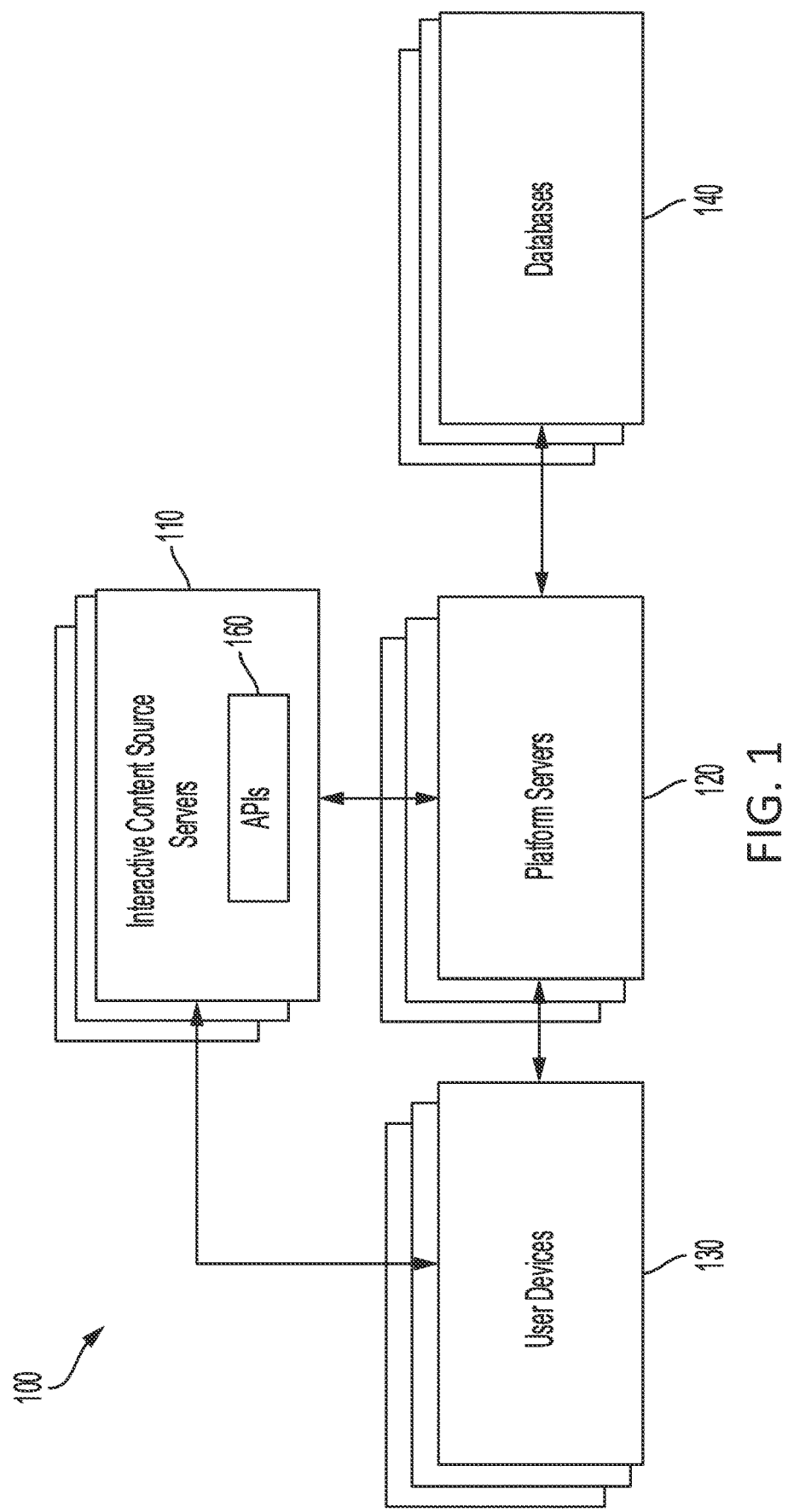
FIG. 1 illustrates a network environment in which a system for computer gaming may be implemented.

FIG. 1 illustrates a network environment in which a system for computer gaming may be implemented. The network environment 100 may include one or more interactive content servers 110 that provide streaming content (e.g., interactive video, podcasts, etc.), one or more platform servers 120, one or more user devices 130, and one or more databases 140.

Interactive content servers 110 may maintain, stream, and host interactive media available to stream on a user device 130 over a communication network. Such interactive content servers 110 may be implemented in the cloud (e.g., one or more cloud servers). Each media may include one or more sets of object data that may be available for participation with (e.g., viewing or interacting with an activity) by a user. Data about the object shown in the media may be stored by the media streaming servers 110, platform servers 120 and/or the user device 130, in an object file 216 ("object file"), as will be discussed in detail with respect to FIGS. 2A and 3.

The platform servers 120 may be responsible for communicating with the different interactive content servers 110, databases 140, and user devices 130. Such platform servers 120 may be implemented on one or more cloud servers. The streaming servers 110 may communicate with multiple platform servers 120, though the media streaming servers 110 may be implemented on one or more platform servers 120. The platform servers 120 may also carry out instructions, for example, receiving a user request from a user to stream streaming media (i.e., games, activities, video, podcasts, User Generated Content ("UGC"), publisher content, etc.) and computer gaming. The platform servers 120 may further carry out instructions, for example, for streaming the streaming media content titles. Such streaming media may have at least one object set associated with at least a portion of the streaming media. Each set of object data may have data about an object (e.g., activity information, zone information, actor information, mechanic information, game media information, etc.) displayed during at least a portion of the streaming media.

The streaming media and the associated at least one set of object data may be provided through an application programming interface (API) 160, which allows various types of media streaming servers 110 to communicate with different platform servers 120 and different user devices 130. API 160 may be specific to the particular computer programming language, operating system, protocols, etc., of the media streaming servers 110 providing the streaming media content titles, the platform servers 120 providing the media and the associated at least one set of object data, and user devices 130 receiving the same. In a network environment 100 that includes multiple different types of media streaming servers 110 (or platform servers 120 or user devices 130), there may likewise be a corresponding number of APIs 160.

The user device 130 may include a plurality of different types of computing devices. For example, the user device 130 may include any number of different gaming consoles, mobile devices, laptops, and desktops. In another example, the user device 130 may be implemented in the cloud (e.g., one or more cloud servers). Such user device 130 may also be configured to access data from other storage media, such as, but not limited to memory cards or disk drives as may be appropriate in the case of downloaded services. Such devices 130 may include standard hardware computing components such as, but not limited to network and media interfaces, non-transitory computer-readable storage (memory), and processors for executing instructions that may be stored in memory. These user devices 130 may also run using a variety of different operating systems (e.g., iOS, Android), applications or computing languages (e.g., C++, JavaScript). An example of a user device 130 is a computer gaming console.

The databases 140 may be stored on the platform server 120, the media streaming servers 110, any of the servers 218 (shown in FIG. 2A), on the same server, on different servers, on a single server, across different servers, or on any of the user devices 130. Such databases 140 may store the streaming media and/or an associated set of object data. Such streaming media may depict one or more objects (e.g., activities) that a user can participate in and/or UGC (e.g., screen shots, videos, commentary, mashups, etc.) created by peers, publishers of the media content titles and/or third party publishers. Such UGC may include metadata by which to search for such UGC. Such UGC may also include information about the media and/or peer. Such peer information may be derived from data gathered during peer interaction with an object of an interactive content title (e.g., a video game, interactive book, etc.) and may be "bound" to and stored with the UGC. Such binding enhances UGC as the UGC may deep link (e.g., directly launch) to an object, may provide for information about an object and/or a peer of the UGC, and/or may allow a user to interact with the UGC. One or more user profiles may also be stored in the databases 140. Each user profile may include information about the user (e.g., user progress in an activity and/or media content title, user id, user game characters, etc.) and may be associated to media.

Figure 2:
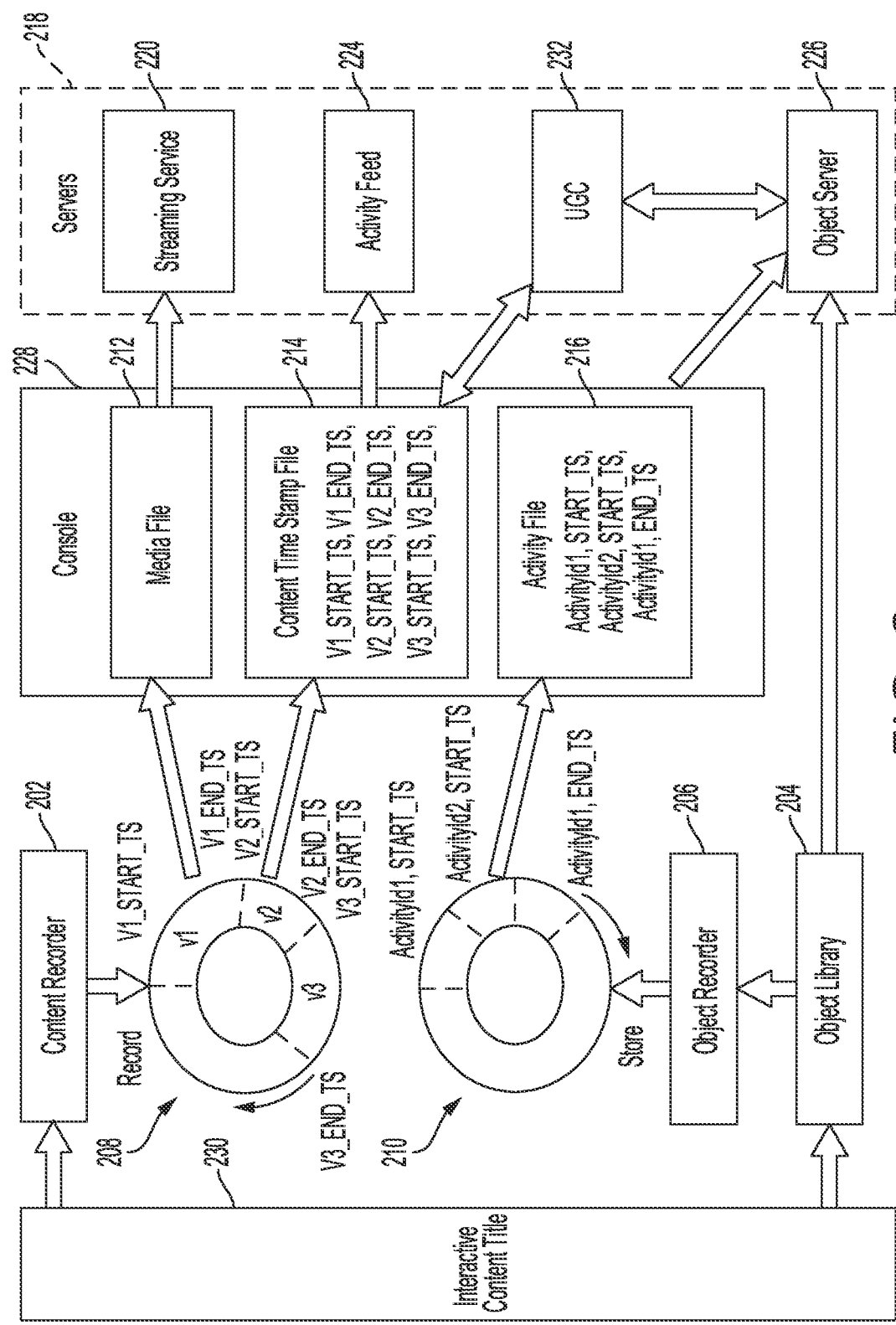
FIG. 2 illustrates an exemplary uniform data system (UDS) that may be used to provide data to a system for updating functions of a gaming apparatus.

FIG. 2 illustrates an exemplary universal or uniform data system (UDS) that may be used to provide data to a system for updating functions of a gaming apparatus. Based on data provided by UDS, a gaming server can be made aware of what in-game objects, entities, activities, and events that users have engaged with, and thus support analysis of and coordination with in-game activities. Each user interaction may be associated the metadata for the type of in-game interaction, location within the in-game environment, and point in time within an in-game timeline, as well as other players, objects, entities, etc., involved. Thus, metadata can be tracked for any of the variety of user interactions that can occur in during a game session, including associated activities, entities, settings, outcomes, actions, effects, locations, and character stats. Such data may further be aggregated, applied to data models, and subject to analytics. Such a UDS data model may be used to assign contextual information to each portion of information in a unified way across games.

As illustrated in FIG. 2, an exemplary console 228 (e.g., a user device 130) and exemplary servers 218 (e.g., streaming server 220, an activity feed server 224, a user-generated content (UGC) server 232, and an object server 226) are shown. In one example, the console 228 may be implemented on the platform server 120, a cloud server, or on any of the servers 218. In an exemplary example, a content recorder 202 may be implemented on the platform server 120, a cloud server, or on any of the servers 218. Such content recorder 202 receives and records content (e.g., media) from an interactive content title 230 onto a content ring-buffer 208. Such ring-buffer 208 may store multiple content segments (e.g., v1, v2 and v3), start times for each segment (e.g., V1_START_TS, V2_START_TS, V3_START_TS), and end times for each segment (e.g., V1_END_TS, V2_END_TS, V3_END_TS). Such segments may be stored as a media file 212 (e.g., MP4, WebM, etc.) by the console 228. Such media file 212 may be uploaded to the streaming server 220 for storage and subsequent streaming or use, though the media file 212 may be stored on any server, a cloud server, any console 228, or any user device 130. Such start times and end times for each segment may be stored as a content time stamp file 214 by the console 228. Such content time stamp file 214 may also include a streaming ID, which matches a streaming ID of the media file 212, thereby associating the content time stamp file 214 to the media file 212. Such content time stamp file 214 may be uploaded and stored to the activity feed server 224 and/or the UGC server 232, though the content time stamp file 214 may be stored on any server, a cloud server, any console 228, or any user device 130.

Concurrent to the content recorder 202 receiving and recording content from the interactive content title 230, an object library 204 receives data from the interactive content title 230, and an object recorder 206 tracks the data to determine when an object beings and ends. The object library 204 and the object recorder 206 may be implemented on the platform server 120, a cloud server, or on any of the servers 218. When the object recorder 206 detects an object beginning, the object recorder 206 receives object data (e.g., if the object were an activity, user interaction with the activity, activity ID, activity start times, activity end times, activity results, activity types, etc.) from the object library 204 and records the activity data onto an object ring-buffer 210 (e.g., ActivityID1, START_TS; ActivityID2, START_TS; ActivityID3, START_TS). Such activity data recorded onto the object ring-buffer 210 may be stored in the object file 216. Such object file 216 may also include activity start times, activity end times, an activity ID, activity results, activity types (e.g., competitive match, quest, task, etc.), user or peer data related to the activity. For example, an object file 216 may store data regarding an item used during the activity. Such object file 216 may be stored on the object server 226, though the object file 216 may be stored on any server, a cloud server, any console 228, or any user device 130.

Such object data (e.g., the object file 216) may be associated with the content data (e.g., the media file 212 and/or the content time stamp file 214). In one example, the UGC server 232 stores and associates the content time stamp file 214 with the object file 216 based on a match between the streaming ID of the content time stamp file 214 and a corresponding activity ID of the object file 216. In another example, the object server 226 may store the object file 216 and may receive a query from the UGC server 232 for an object file 216. Such query may be executed by searching for an activity ID of an object file 216 that matches a streaming ID of a content time stamp file 214 transmitted with the query. In yet another example, a query of stored content time stamp files 214 may be executed by matching a start time and end time of a content time stamp file 214 with a start time and end time of a corresponding object file 216 transmitted with the query. Such object file 216 may also be associated with the matched content time stamp file 214 by the UGC server 232, though the association may be performed by any server, a cloud server, any console 228, or any user device 130. In another example, an object file 216 and a content time stamp file 214 may be associated by the console 228 during creation of each file 216, 214.

Figure 3:
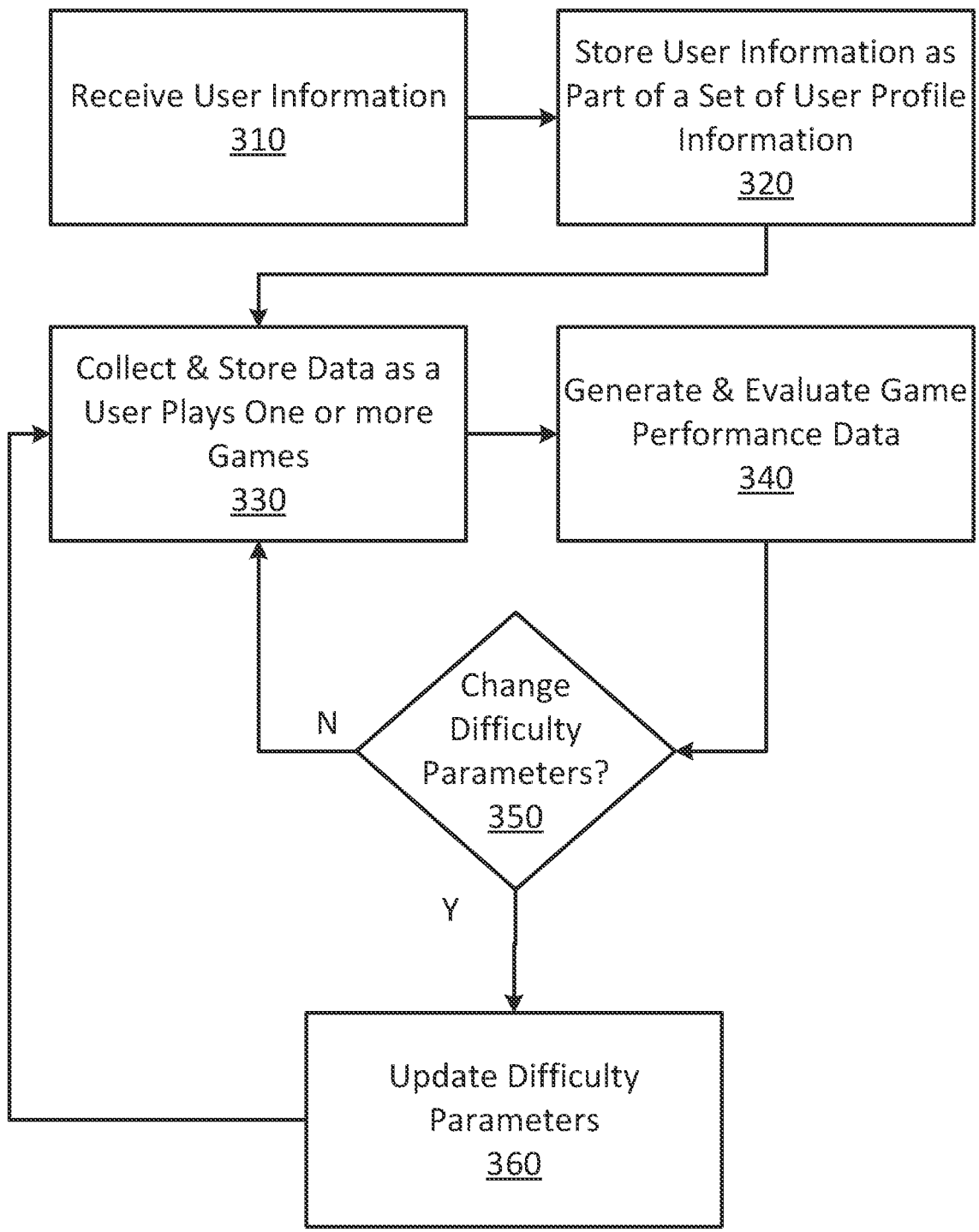
FIG. 3 illustrates a series of steps that may be performed when parameters associated the difficulty of a game are maintained or updated based on how well a user performs when playing the game.

FIG. 3 illustrates a series of steps that may be performed when parameters associated the difficulty of a game are maintained or updated based on how well a user performs when playing the game. This user information may uniquely identify a user and may include a username and/or login information. Next in step 320, this user information may be stored as part of a set of user profile information and then data may be collected as the user plays one or more games in step 330. Step 330 may also include monitoring and collecting metrics associated with game performance.

Step 340 of FIG. 3 may include generating and evaluating game performance data. This may include identifying whether objectives of a game that is currently being played by a user meet a threshold level or some predetermined level (i.e. an expected user performance level). For example, in a racing game, metrics may relate to an ability of a user driving a vehicle in a game to prevent other vehicles from passing their vehicle. Metrics of this racing game may also be related a percentage of successful passing attempts associated with the user. Here a median level of performance may correspond to the user having been successful in preventing their vehicle from being passed by another vehicle 80% of the time. This median level may also correspond to a passing success rate of 50%. Such a passing success level may correspond to the user successfully passing another vehicle once for each two passing attempts during a time span of game play. In such an instance (when a user expectation level is set at this median level), a user should be able to prevent other vehicles from passing his vehicle at least 8 out of 10 times, and that user should be able to successfully pass at least one half of the vehicles he attempts to pass. Otherwise, the user's current performance level would not correspond to the current user expectation level.

Determination step 350 may identify whether difficulty parameters of a game should be changed. This may include identifying whether the user's current user performance level meets or exceeds (i.e. corresponds to) the current user expectation level. When determination step 350 identifies that the difficulty parameters should not be changed, program flow may move back to step 330 where additional data is collected and stored. When determination step 350 identifies that the difficulty parameters should be updated, program flow moves to step 360 where one or more difficulty parameters are updated.

In certain instances, changes to parameters may have to be authorized based on user feedback. This may include providing a prompt to the user identifying that the game difficulty can be either increased or decreased based on the user's performance when using a current set of gaming difficulty parameters. The user could then confirm that the increase or decrease in gaming difficulty should be initiated. Alternatively, a user may provide commands that change difficulty parameters. This may include receiving impromptu indications from the user via a user interface to increase or decrease the game difficulty. Here a user may simply press a button to instruct a gaming system to update a difficulty level. In yet other instances, gaming system difficulty parameters may be updated automatically based on rules of a machine learning or artificial intelligent set of program code.

When a user's driving does meet an expectation level and potentially when the user agrees, determination step 350 may identify particular difficulty parameters of a game that should be changed in step 360. After step 360, program flow may move back to step 330 where additional data may be collected and stored.

In respect to the example above, determination step 350 may identify that the difficulty parameters should be updated when the user's driving meets or exceeds the 80% prevent pass level and meets or exceeds the 50% successful pass level. Difficulty parameters assigned to a user may be different classes that may include a speed class, a sensitivity class, a proficiency class, and possibly a number of competitors. This speed class of metrics may be associated with a mobility parameter that relates to how fast an opponent can move in a linear direction or an agility parameter that relates to how fast an opponent can change directions. The sensitivity class of metrics may be associated with a reaction time parameter (e.g. a reflex reaction time) or a delay parameter (e.g. a thinking or focusing time). The proficiency class of metrics may be associated with an anticipatory parameter that relates to forecasting a next action that could be made by the user and initiating a countermeasure based on that forecast. These proficiency class of metrics may also include an endurance or strength parameter, and possibly a tenacity parameter. A number of competitors metric may be used to set a number of competitors (e.g. virtual vehicles) that are pitted against the user in a game.

Figure 4:
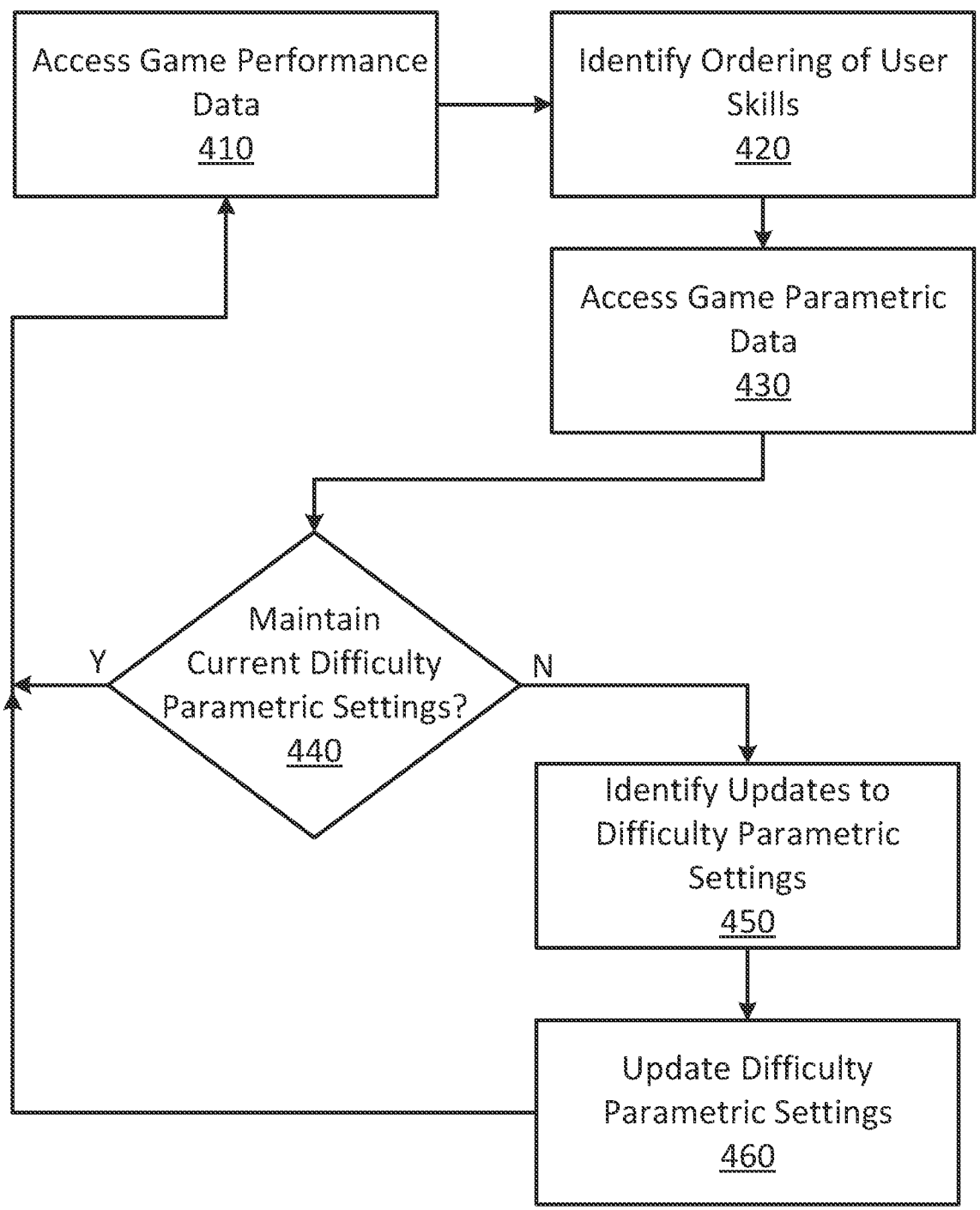
FIG. 4 illustrates a series of steps that may be performed when one or more parameters associated with the performance of a game may be updated based on how well a particular user is performing during the playing of a game.

FIG. 4 illustrates a series of steps that may be performed when one or more parameters associated with the performance of a game may be updated based on how well a particular user is performing during the playing of a game. FIG. 4 begins with step 410 where game performance data is accessed. This data may be indicative of how well a user is performing at a game. As discussed in respect to FIG. 3, a level of game performance could correspond how often a user playing a driving game prevents other vehicles from passing the vehicle that they are driving and how successful the user is at passing other vehicles. In a first-person shooting game, game performance data may relate to a number of targets hit out of a number of shots at the targets. Other examples of game performance data may relate to how successful the user has been at destroying targets or how successful the user has been at meeting some other game objective. Next in step 420, an ordering of user skills may be identified. A user of an in-person shooting game may be good at using a sniper rifle, have moderate skills using an automatic rifle, and have poor skills at hand-to-hand combat. Such skills and related skill levels may be identified based on an evaluation of the accessed gaming performance data.

Game parametric data may then be accessed in step 430 of FIG. 4. This game parametric data may include classes of metrics discussed above, such as the speed class, sensitivity class, and the proficiency class of metrics. Additionally, parametric data may include the number of competitors discussed above. Determination step 440 may then evaluate the game performance data, the skills ordering data, and the game parametric data to see whether a current set of difficulty parametric settings should be maintained or changed. When determination step 440 identifies that the current set of parametric settings should be maintained, program flow may move back to step 410 where the process repeats as the user continues to play the game.

When determination step 440 identifies that the current set of difficulty parametric settings should not be maintained, program flow may move to step 450 where specific difficulty parametric settings that should be updated are identified and then these difficulty parametric settings may be updated in step 460 of FIG. 4. In certain instances, the difficulty parametric settings identified in step 450 may be identified based on the ordering of user skills in step 420. For example, when the user playing a first-person shooter game has good skills using a sniper rifle, has moderate skills using an automatic rifle, and has poor skills at hand-to-hand combat, performance metrics associated with competitors actions in scenes of the game where an automatic rifle is used and where hand to hand combat is performed may be slowed down using speed, sensitivity, and/or proficiency parameters. This may result in an adversary moving more slowly, being less agile, having a slower reaction time to stimuli (actions of the user's character or aiming a rifle), being less accurate, or being weaker. Such adjustments would result the user of the game being more proficient when playing the game. As the game play continues, one or more of these parameters may be changed in order to incrementally increase the abilities of the adversaries that the user fights. Here an adversary could be move somewhat faster, yet still have limited agility and slower reaction time. In a next update, the adversary could have better agility, yet still have a slower reaction time to stimuli. As mentioned above in respect to FIG. 3, difficulty parameters may be updated automatically, be based on user consent, or be commanded by a user. After step 460, program flow may move back to step 410 where game play may continue when an updated set of difficulty parameters are used.

In certain instances, a skill associated with one game may correspond to a aptitude of another game. For example, a person skillful a moving to new positions in a first-person shooter game may correspond to the person running quickly in a racing game. Alternatively, a weakness of the person playing a first-person game may include taking too long to accurately aim at a target and this weakness may correspond to a tendency for that person to not react quickly when a vehicle attempts to pass their vehicle in a racing game. This means that data gathered from one game may be used to help select difficulty parameters to update with a person plays a different game.

Figure 5:
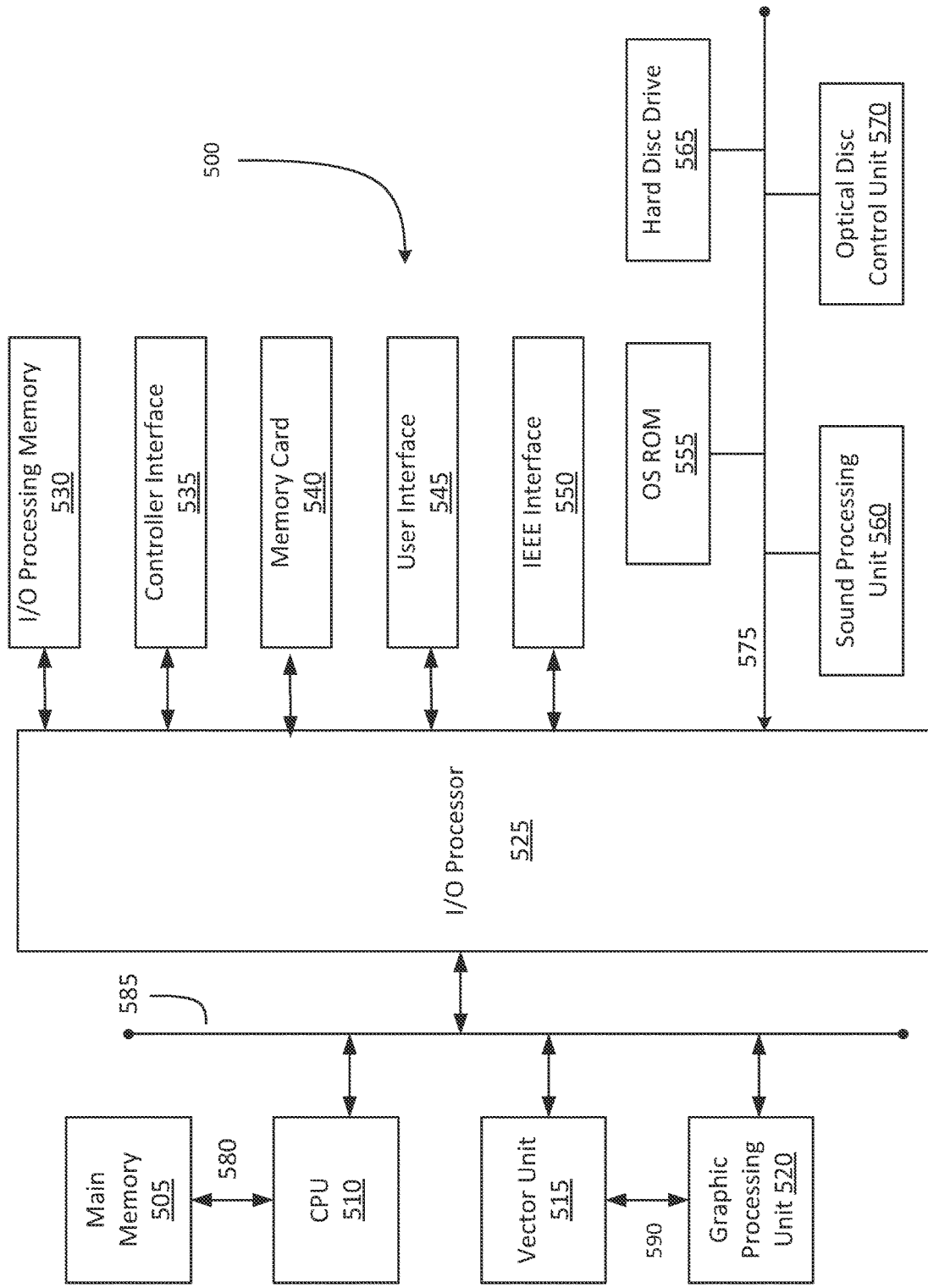
FIG. 5 is a block diagram of an exemplary electronic entertainment system that may be used in embodiments of the present invention.

FIG. 5 is a block diagram of an exemplary electronic entertainment system 500. The entertainment system 500 of FIG. 5 includes a main memory 505, a central processing unit (CPU) 510, vector unit 58, a graphics processing unit 520, an input/output (I/O) processor 525, an I/O processor memory 530, a controller interface 535, a memory card 540, a Universal Serial Bus (USB) interface 545, and an IEEE interface 550. The entertainment system 500 further includes an operating system read-only memory (OS ROM) 555, a sound processing unit 560, an optical disc control unit 570, and a hard disc drive 565, which are connected via a bus 575 to the I/O processor 525.

Entertainment system 500 may be an electronic game console. Alternatively, the entertainment system 500 may be implemented as a general-purpose computer, a set-top box, a hand-held game device, a tablet computing device, or a mobile computing device or phone. Entertainment systems may contain more or less operating components depending on a particular form factor, purpose, or design.

The CPU 510, the vector unit 58, the graphics processing unit 520, and the I/O processor 525 of FIG. 5 communicate via a system bus 585. Further, the CPU 510 of FIG. 5 communicates with the main memory 505 via a dedicated bus 580, while the vector unit 58 and the graphics processing unit 520 may communicate through a dedicated bus 590. The CPU 510 of FIG. 5 executes programs stored in the OS ROM 555 and the main memory 505. The main memory 505 of FIG. 5 may contain pre-stored programs and programs transferred through the I/O Processor 525 from a CD-ROM, DVD-ROM, or other optical disc (not shown) using the optical disc control unit 570. I/O Processor 525 of FIG. 5 may also allow for the introduction of content transferred over a wireless or other communications network (e.g., 4$, LTE, 3G, and so forth). The I/O processor 525 of FIG. 5 primarily controls data exchanges between the various devices of the entertainment system 500 including the CPU 510, the vector unit 58, the graphics processing unit 520, and the controller interface 535.

The graphics processing unit 520 of FIG. 5 executes graphics instructions received from the CPU 510 and the vector unit 58 to produce images for display on a display device (not shown). For example, the vector unit 58 of FIG. 5 may transform objects from three-dimensional coordinates to two-dimensional coordinates, and send the two-dimensional coordinates to the graphics processing unit 520. Furthermore, the sound processing unit 560 executes instructions to produce sound signals that are outputted to an audio device such as speakers (not shown). Other devices may be connected to the entertainment system 500 via the USB interface 545, and the IEEE 1394 interface 550 such as wireless transceivers, which may also be embedded in the system 500 or as a part of some other component such as a processor.

A user of the entertainment system 500 of FIG. 5 provides instructions via the controller interface 535 to the CPU 510. For example, the user may instruct the CPU 510 to store certain game information on the memory card 540 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for adaptive difficulty across skills, the method comprising:
   storing data indicative of a user performance level identified based on an analysis of collected game performance data associated with a user exercising a plurality of different skills in a virtual environment of a digital content title;
   comparing the user performance level to a specified expectation level associated with each of a plurality of available activities in the digital content title;
   predicting one or more deviations between the user performance level and the specified expectation level based on the comparison, the predicted deviations corresponding to one or more upcoming events associated with a set of different skills within a current interactive session;
   selecting a game difficulty parameter of a set of game difficulty parameters to apply to each of the upcoming events based on the predicted deviations, wherein the game difficulty parameter is selected based on an ordering of one or more of the different skills associated with the respective upcoming event; and
   dynamically applying the selected game difficulty parameter to the associated event of the upcoming events during the interactive session, wherein the user is challenged to exercise the skill from the set associated with the associated event in accordance with the dynamically applied game difficulty parameter.

2. The method of claim 1, further comprising identifying whether an updated user performance level corresponds to the specified expectation level based on an analysis of game performance data regarding the event, and dynamically adjusting the game difficulty parameter based on the user performance level being more or less than the specified expectation level by a threshold amount.

3. The method of claim 1, wherein the game difficulty parameter corresponds to a speed or strength of a character played by the user or an adversarial game character.

4. The method of claim 1, wherein the game difficulty parameter corresponds to a time delay or an adjustment to a timing of the event.

5. The method of claim 1, further comprising generating the ordering of the skills based on the collected game performance data.

6. The method of claim 5, further comprising:
   evaluating game performance data collected when the user plays a second interactive session associated with a same or different digital content title;
   identifying that the evaluated game performance data corresponds to exercise of one or more of the skills associated with the user; and
   updating the stored game performance data based on the evaluated performance data associated with the one or more skills exercised in the second interactive session.

7. The method of claim 1, wherein the stored performance data regarding the different skills of the user includes game data associated with a plurality of different digital content titles.

8. The method of claim 1, wherein a plurality of selected game difficulty parameters is dynamically applied to different events during the interactive session to adjust a difficulty level of each of the different events in accordance with the associated skill.

9. The method of claim 1, wherein a different selected game difficulty parameter is selected for a different user associated with a different user performance level across the different skills.

10. The method of claim 1, wherein the user performance level includes a plurality of different user performance levels for each of the different skills.

11. A system for adaptive difficulty across skills, the system comprising:
memory that stores data indicative of a user performance level identified based on an analysis of collected game performance data associated with a user exercising a plurality of different skills in a virtual environment of a digital content title; and
a processor that executes instructions stored in memory, wherein the processor executes the instructions to:
compare the user performance level to a specified expectation level associated with each of a plurality of available activities in the digital content title;
predict one or more deviations between the user performance level and the specified expectation level based on the comparison, the predicted deviations corresponding to one or more upcoming events associated with a set of different skills within a current interactive session;
select a game difficulty parameter of a set of game difficulty parameters to apply to each of the upcoming events based on the predicted deviations, wherein the game difficulty parameter is selected based on an ordering of one or more of the different skills associated with the respective upcoming event; and
dynamically apply the selected game difficulty parameter to the associated event of the upcoming events during the interactive session, wherein the user is challenged to exercise the skill from the set associated with the associated event in accordance with the dynamically applied game difficulty parameter.

12. The system of claim 11, wherein the processor executes further instructions to identify whether an updated user performance level corresponds to the specified expectation level based on an analysis of game performance data regarding the event, and dynamically adjust the game difficulty parameter based on the user performance level being more or less than the specified expectation level by a threshold amount.

13. The system of claim 11, wherein the game difficulty parameter corresponds to a speed or strength of a character played by the user or an adversarial game character.

14. The system of claim 11, wherein the game difficulty parameter corresponds to a time delay or an adjustment to a timing of the event.

15. The system of claim 11, wherein the processor executes further instructions to generate the ordering of the skills based on collected game performance data.

16. The system of claim 15, wherein the processor executes further instructions to:
evaluate game performance data collected when the user plays a second interactive session associated with a same or different digital content title;
identify that the evaluated game performance data corresponds to exercise of one or more of the skills associated with the user; and
update the stored game performance data based on the evaluated performance data associated with the one or more skills exercised in the second interactive session.

17. The system of claim 11, wherein the stored performance data regarding the different skills of the user includes game data associated with a plurality of different digital content titles.

18. The system of claim 11, wherein a plurality of selected game difficulty parameters is dynamically applied to different events during the interactive session to adjust a difficulty level of each of the different events in accordance with the associated skill.

19. The system of claim 11, wherein a different selected game difficulty parameter is selected for a different user associated with a different user performance level across the different skills.

20. The system of claim 11, wherein the user performance level includes a plurality of different user performance levels for each of the different skills.

21. A non-transitory, computer-readable storage medium, having embodied thereon a program executable by a processor to perform a method for adaptive difficulty across skills, the method comprising:
storing data indicative of a user performance level identified based on an analysis of collected game performance data associated with a user exercising a plurality of different skills in a virtual environment of a digital content title;
comparing the user performance level to a specified expectation level associated with each of a plurality of available activities in the digital content title;
predicting one or more deviations between the user performance level and the specified expectation level based on the comparison, the predicted deviations corresponding to one or more upcoming events associated with a set of different skills within a current interactive session;
selecting a game difficulty parameter of a set of game difficulty parameters to apply to each of the upcoming events based on the predicted deviations, wherein the game difficulty parameter is selected based on an ordering of one or more of the different skills associated with the respective upcoming event; and
dynamically applying the selected game difficulty parameter to the associated event of the upcoming events during the interactive session, wherein the user is challenged to exercise the skill from the set associated with the associated event in accordance with the dynamically applied game difficulty parameter.

* * * * *